US009261708B2

(12) United States Patent
Lee

(10) Patent No.: US 9,261,708 B2
(45) Date of Patent: Feb. 16, 2016

(54) THREE DIMENSIONAL IMAGE DISPLAY DEVICE

(71) Applicant: Samsung Display Co., Ltd., Yongin (KR)

(72) Inventor: Chang-Hun Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 7 days.

(21) Appl. No.: 14/448,551

(22) Filed: Jul. 31, 2014

(65) Prior Publication Data

US 2015/0146117 A1    May 28, 2015

(30) Foreign Application Priority Data

Nov. 28, 2013  (KR) .................. 10-2013-0146334

(51) Int. Cl.

| | |
|---|---|
| *G02B 27/26* | (2006.01) |
| *G02F 1/1335* | (2006.01) |
| *G02F 1/1343* | (2006.01) |
| *G02B 5/30* | (2006.01) |

(52) U.S. Cl.
CPC .............. *G02B 27/26* (2013.01); *G02F 1/1343* (2013.01); *G02F 1/133528* (2013.01); *G02B 5/3033* (2013.01)

(58) Field of Classification Search
CPC .... G02B 27/221; G02B 27/225; G02B 27/22; G02B 3/0087; G02B 3/08; G02F 2001/294
See application file for complete search history.

(56) References Cited

U.S. PATENT DOCUMENTS

| | | | | |
|---|---|---|---|---|
| 4,039,254 | A * | 8/1977 | Harsch ................... | A61F 9/062 2/8.4 |
| 2009/0296030 | A1* | 12/2009 | Ikebe ................ | G02F 1/134363 349/110 |
| 2010/0097449 | A1* | 4/2010 | Jeong ................. | G02B 27/2214 348/59 |
| 2012/0019733 | A1 | 1/2012 | Kim et al. | |
| 2012/0300042 | A1 | 11/2012 | Yun et al. | |
| 2013/0100365 | A1 | 4/2013 | Komura et al. | |
| 2013/0107174 | A1 | 5/2013 | Yun et al. | |
| 2013/0135545 | A1 | 5/2013 | Jung et al. | |
| 2013/0208196 | A1 | 8/2013 | Kim et al. | |
| 2013/0314627 | A1* | 11/2013 | Liu ..................... | G02B 27/2242 349/15 |
| 2014/0160378 | A1* | 6/2014 | Moon ................. | G02B 27/2214 349/15 |
| 2014/0204326 | A1* | 7/2014 | Wu .................... | G02F 1/133707 349/143 |
| 2015/0109570 | A1* | 4/2015 | Yim .................... | G02B 27/2214 349/139 |

(Continued)

FOREIGN PATENT DOCUMENTS

| | | |
|---|---|---|
| KR | 1020120067623 | 6/2012 |
| KR | 1020130028645 | 3/2013 |
| KR | 1020130046116 | 5/2013 |

*Primary Examiner* — Tracie Y Green
(74) *Attorney, Agent, or Firm* — H.C. Park & Associates, PLC

(57) ABSTRACT

A 3D image display device includes: a liquid crystal (LC) display panel including, a first array substrate (AS) including a gate line (GL) extending in a first direction (FD), a data line (DL) extending in a second direction (SD) substantially perpendicular to the FD, and a pixel electrode (PE) connected to the GL and the DL and having first branch electrode portions (FBEPs) having a first width, each of the FBEPs being spaced from each other by a first interval substantially ≥the first width, and a LC lens panel including a second AS including lens electrodes (LEs) extending in a third direction (TD) tilted with respect to the SD by a first angle having an absolute value ≥about 5° and ≤about 15°. Each of the FBEPs extends in a fourth direction having a first tilting angle with respect to the TD by about 45° or about 135°.

20 Claims, 8 Drawing Sheets

(56) References Cited

U.S. PATENT DOCUMENTS

| | | | |
|---|---|---|---|
| 2015/0131045 A1* | 5/2015 | Yi | G02F 1/133509 349/143 |
| 2015/0160464 A1* | 6/2015 | Oh | G02B 27/2214 349/15 |
| 2015/0160508 A1* | 6/2015 | Kim | G02F 1/133526 349/200 |
| 2015/0192781 A1* | 7/2015 | Lee | G02B 27/2214 349/128 |
| 2015/0219910 A1* | 8/2015 | Jang | G02B 27/2214 349/15 |
| 2015/0219911 A1* | 8/2015 | Cho | G02B 27/2214 349/15 |
| 2015/0253579 A1* | 9/2015 | Kim | G02B 27/2214 349/15 |

\* cited by examiner

THREE DIMENSIONAL IMAGE DISPLAY DEVICE

CROSS-REFERENCE TO RELATED APPLICATION

This application claims priority from and the benefit of Korean Patent Application No. 10-2013-0146334, filed on Nov. 28, 2013, which is hereby incorporated by reference for all purposes as if fully set forth herein.

BACKGROUND

1. Field

Exemplary embodiments of the invention relate to a display device. More particularly, exemplary embodiments of the invention relate to a three-dimensional image display device capable of improving display quality.

2. Discussion of the Background

As demand for three-dimensional ("3D") stereoscopic images increases in consumer markets including the game market, the movie market, and so on, display devices configured to display 3D stereoscopic images have been developed. For example, conventional 3D display devices are configured to present two-dimensional ("2D") images different from each other to respective eyes of an observer, such that the 3D stereoscopic image can be autonomically perceived by the observer. For example, the observer may view a pair of 2D images through respective left and right eyes, and then the 2D images may be mixed in the observer's brain to be recognized as a 3D stereoscopic image.

Typically, 3D stereoscopic display devices are classified into a glasses type display device and a no-glasses type display device. The glasses type display device utilizes polarized light to respectively radiate 2D images to respective left and right eyes of viewers, whereas the no-glasses type display device utilizes a lenticular lens to separate and, thereby, direct the presentation of left-eye images and right-eye images to corresponding eyes of an observer. For instance, display devices of the glasses type include an active polarizing panel in which a left-eye image and a right-eye image are displayed, such that the display panel changes the polarization of light associated with each image so that the observer, via polarized light glasses, is able to perceive the left-eye image via their left-eye and the right-eye image via their right-eye. Display devices of the no-glasses type include a lenticular lens in which a left-eye image and a right-eye image displayed on sub-pixels of a display panel are diffracted into a plurality of views, so that an observer may view the left-eye image via their left-eye and the right-eye image via their right-eye. For example, a liquid crystal lens panel may be used as the lenticular lens. The liquid crystal lens panel may include a liquid crystal layer interposed between an upper electrode and a lower electrode.

The liquid crystal lens panel may be disposed on a 2D image display panel, thereby refracting 2D images from the 2D image display panel toward a plurality of viewpoint. If the 2D image display panel includes a black matrix, then the black matrix may be enlarged due to the liquid crystal lens panel in a certain situation, thereby generating moiré phenomenon which may be perceived by the observer as undesired stripes.

A polarizing axis of the 2D image display panel may be tilted by an angle with respect to a transmitting axis of the liquid crystal lens panel in order to reduce the moiré phenomenon. However, an overall luminance of 3D image emitted from the liquid crystal lens panel may be reduced due to the tilting of the transmitting axis of the liquid crystal lens panel.

Also, an alignment direction of an upper alignment layer of the liquid crystal lens panel may be tilted by an angle with respect to an alignment direction of a lower alignment layer of the liquid crystal lens panel in order to reduce the moiré phenomenon. However, a theoretically perfect condition such as, e.g., Moguin condition or Gooch-Tarry condition may be hardly achieved in a practical liquid crystal lens panel, and the theoretically perfect condition may be inadequate to a large liquid crystal lens panel.

The above information disclosed in this Background section is only for enhancement of understanding of the background of the invention and therefore it may contain information that does not form any part of the prior art nor what the prior art may suggest to a person of ordinary skill in the art.

SUMMARY

One or more exemplary embodiments of the invention provide a three-dimensional image display device capable of reducing moiré phenomenon and improving luminance of a three-dimensional image.

Additional features of the invention will be set forth in the description which follows, and in part will be apparent from the description, or may be learned by practice of the invention.

An exemplary embodiment of the present invention discloses a three-dimensional image display device including, a liquid crystal display panel including, a first array substrate including a gate line extending in a first direction, a data line extending in a second direction substantially perpendicular to the first direction, and a pixel electrode electrically connected to the gate line and the data line, the pixel electrode having a plurality of first branch electrode portions having a first width, each of the plurality of first branch electrode portions being spaced apart from each other by a first interval substantially equal to or greater than the first width, and a liquid crystal lens panel including a second array substrate, the second array substrate including a plurality of lens electrodes, each of the plurality of lens electrodes extending in a third direction which is tilted with respect to the second direction by a first angle, the first angle having an absolute value in a range from greater than or equal to about 5 degrees and less than or equal to about 15 degrees, wherein each of the plurality of first branch electrode portions extends in a fourth direction having a first tilting angle with respect to the third direction by about 45 degrees or about 135 degrees.

An exemplary embodiment of the present invention also discloses a three-dimensional image display device including, a liquid crystal display panel configured to display an image and including, a first array substrate including a gate line extending in a first direction, a data line extending in a second direction substantially perpendicular to the first direction, and a pixel electrode electrically connected to the gate line and the data line and including a sub-electrode pattern including a plurality of slits, a first opposing substrate facing a first face of the first array substrate, and a first liquid crystal layer disposed between the first opposing substrate and the first face of the first array substrate; and a liquid crystal lens panel configured to refract light from the liquid crystal display panel and including a second array substrate including a plurality of lens electrodes extending in a third direction which is tilted by a first angle with respect to the second direction, the first angle being greater than or equal to about −15 degrees and less than or equal to about −5 degrees or the first angle being greater than or equal to about +5 degrees and less than or equal to about +15 degrees, a second opposing substrate facing the second array substrate and including a lens common electrode, and a second liquid crystal layer disposed between the second array substrate and the second opposing substrate, wherein the slits extend in a fifth direction tilted by a second angle with respect to the third direction or a fourth direction substantially perpendicular to the third direction, the second angle having a second absolute value in a range from a first absolute value of the first angle to about 45.

According to one or more exemplary embodiment of the three-dimensional image display device, an electrode pattern of a pixel electrode in the liquid crystal display panel may be tilted by an angle with respect to an extending direction of lens electrodes in the liquid crystal lens panel instead of an extending direction of the gate line or the data line, thereby substantially parallelizing a polarizing axis of a display panel assembly with a polarizing axis of a lens panel assembly to increase luminance of a three-dimensional image.

Also, an alignment direction of an upper alignment layer of the liquid crystal lens panel may be substantially parallel with an alignment direction of a lower alignment layer of the liquid crystal lens panel, thereby reducing moiré phenomenon which may occur due to a light blocking pattern of the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE ILLUSTRATED EMBODIMENTS

Figure 1:
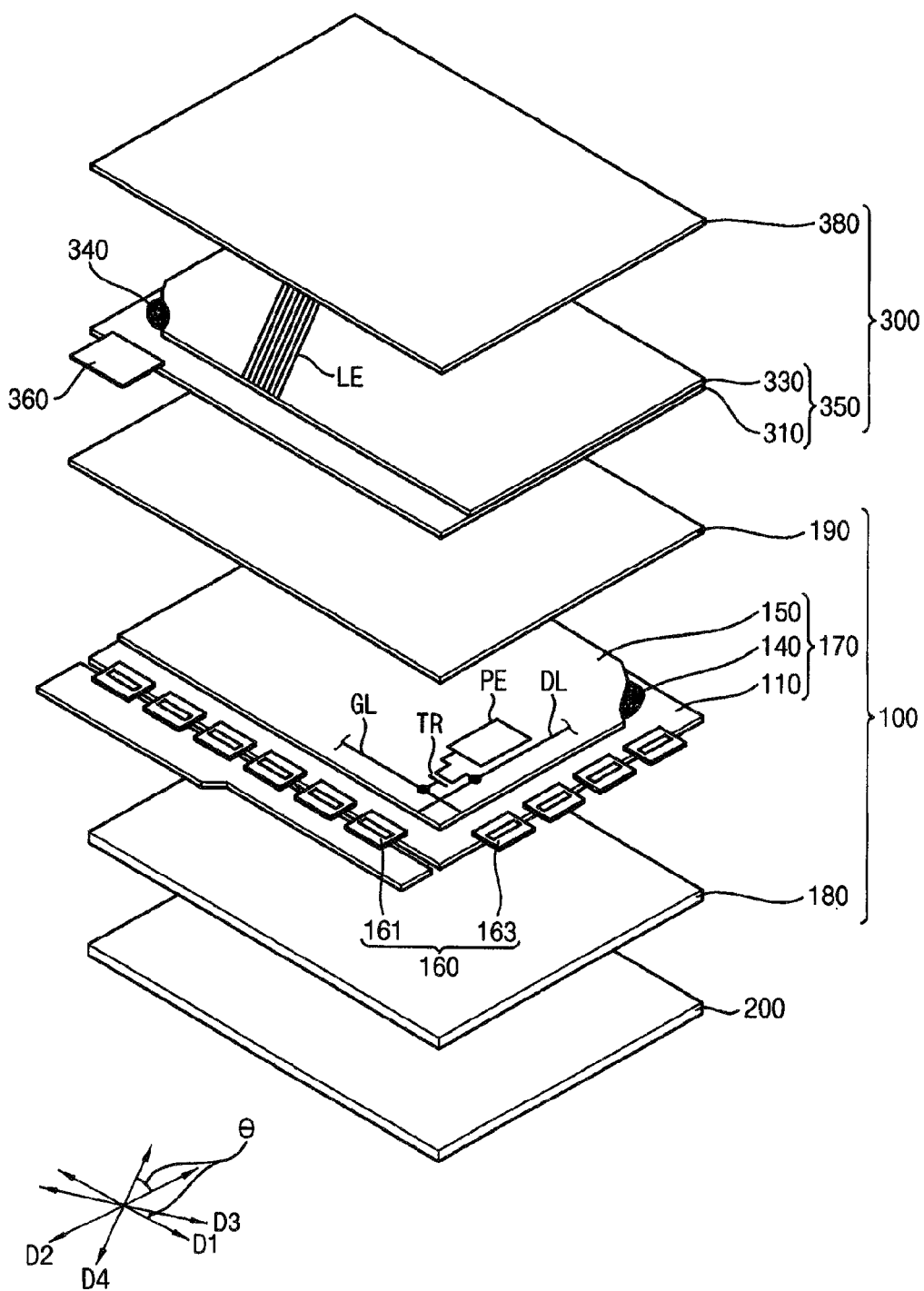
FIG. 1 is an exploded perspective view illustrating a three-dimensional image display device according to an exemplary embodiment of the invention.

Hereinafter, exemplary embodiments of the invention will be described in further detail with reference to the accompanying drawings. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
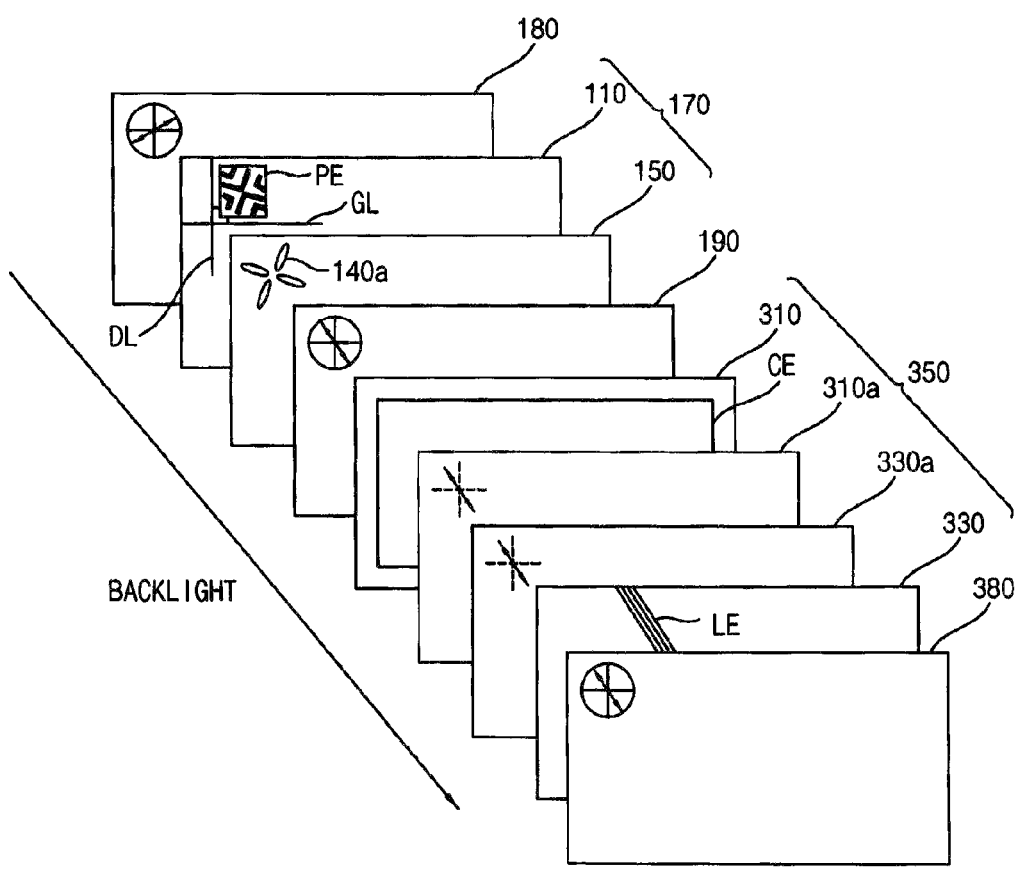
FIG. 2 is an exploded perspective view illustrating a display panel assembly and a lens panel assembly of FIG. 1.
Figure 2:
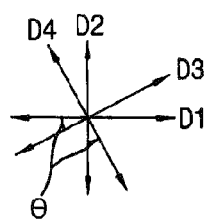

FIG. 1 is an exploded perspective view illustrating a three-dimensional image display device according to an exemplary embodiment of the invention. FIG. 2 is an exploded perspective view illustrating a display panel assembly and a lens panel assembly of FIG. 1.

Referring to FIG. 1 and FIG. 2, a display device according to the present exemplary embodiment may include a display panel assembly 100, a light source part 200 and a lens panel assembly 300.

The display panel assembly 100 may include a liquid crystal display panel 170, an image driving part 160, a first polarizer 180 and a second polarizer 190. The image driving part 160 may be configured to drive the liquid crystal display panel 170. The first polarizer 180 may be disposed under the liquid crystal display panel 170. The second polarizer 190 may be disposed on the liquid crystal display panel 170. The first polarizer 180 and the second polarizer 190 may be formed of polyvinyl alcohol (PVA) stained/stretched film. The first polarizer 180 and the second polarizer 190 may further include protective layers disposed on their surfaces.

The liquid crystal display panel 170 may include a first array substrate 110, a first opposing substrate 150 and a first liquid crystal layer 140.

The first array substrate 110 may include a plurality of gate lines GL, a plurality of data lines DL, a plurality of switching elements TR and a plurality of pixel electrodes PE. The gate lines GL may extend in a first direction D1. The gate lines GL may be arranged in a second direction D2 substantially perpendicular to the first direction D1. The data lines DL may extend in the second direction D2. The data lines DL may be arranged in the first direction D1. The switching elements TR may be electrically connected to the gate lines GL and the data lines DL, respectively. The pixel electrodes PE may be electrically connected to the switching elements TR, respectively. The pixel electrodes PE may be disposed in pixel areas. Each of the pixel electrodes PE may include an electrode pattern having a plurality of silts. The electrode pattern of the pixel electrodes PE may be described in detail referring to FIG. 3.

The first opposing substrate 150 may face the first array substrate 110. The first liquid crystal layer 140 may be disposed between the first array substrate 110 and the first opposing substrate 150. The first opposing substrate 150 may include a light blocking pattern. The first opposing substrate 150 may include a plurality of color filters which overlaps the pixel areas. In another exemplary embodiment, the first array substrate 110, instead of the first opposing substrate 150, may include the light blocking pattern or the color filters. The first opposing substrate 150 may further include a pixel common electrode configured to form a vertical electric field with the pixel electrodes PE of the first array substrate 110. In another exemplary embodiment, the first array substrate 110, instead of the first opposing substrate 150, may include the pixel common electrode configure to form a horizontal electric field with the pixel electrodes PE.

The image driving part 160 may display multi-viewpoint images on the liquid crystal display panel 110. The image driving part 160 may include a gate driving part 163 and a data driving part 161. The gate driving part 163 may be configured to provide the gate lines GL with gate signals. As illustrated in FIG. 1, the gate driving part 163 may be disposed on (e.g., mounted on) the liquid crystal display panel 110, such as, in the form of, a tape carrier package ("TCP"), or may be directly disposed on (e.g., formed on) the first array substrate 110. In this manner, the gate driving part 163 may be formed via one or more of the process utilized in association with forming the switching elements TR. The data driving part 161 may output data signals to the data lines DL. The data driving part 161 may also be disposed on (e.g., mounted on) the liquid crystal display panel 110, such as, in the form of, a tape carrier package ("TCP"), or may be directly disposed on (e.g., formed on) the first array substrate 110.

The liquid crystal display panel 170 may be configured to display n-viewpoint images where n is a natural number greater than one. For example, one frame image may include a plurality of viewpoint images.

The light source part 200 may be configured to generate light toward the display panel assembly 100. The light source part 200 may be or include a direct-illumination type and/or an edge-illumination type light source. The direct-illumination type light source may include at least one light source disposed under a display area of the liquid crystal display panel 110, in which the pixel electrodes PE are arranged. The edge-illumination type light source may include a light guide plate disposed under the display area of the liquid crystal display panel 110, as well as include at least one light source disposed on an edge portion of the light guide plate.

The first polarizer 180 may be disposed between the liquid crystal display panel 170 and the light source part 200. The first polarizer 180 may polarize the light from the light source part 200 toward a first polarizing axis along a third direction D3 which is tilted by a first angle θ with respect to the first direction D1. The first angle θ may be greater than or equal to about +5 degrees and less than or equal to about +15 degrees. For example, the first angle θ may be substantially about +10 degrees.

The second polarizer 190 may be disposed between the liquid crystal display panel 170 and the lens panel assembly 300. The second polarizer 190 may polarize the light from the liquid crystal display panel 170 toward a second polarizing axis along a fourth direction D4 which is tilted by the first angle θ with respect to the second direction D2. The first angle θ may be greater than or equal to about +5 degrees and less than or equal to about +15 degrees. For example, the first angle θ may be substantially about +10 degrees. The fourth direction D4 may be substantially perpendicular to the third direction D3.

The lens panel assembly 300 may include a liquid crystal lens panel 350, a third polarizer 380 and an active driving part 360. The third polarizer 380 may be formed similarly to the first polarizer 180 and the second polarizer 190.

The liquid crystal lens panel 350 may include a second array substrate 330, a second opposing substrate 310 and a second liquid crystal layer 340.

The second array substrate 330 may include a plurality of lens electrodes LE and a first alignment layer 330a. The first alignment layer 330a may be aligned along a first alignment direction. The first alignment direction may be substantially parallel with a direction in which the lens electrodes LE extend. The lens electrodes LE may be grouped to a plurality of electrode groups which correspond to a plurality of liquid crystal lens units. Each of the electrode groups may include a number of the lens electrodes LE. The lens electrodes LE may extend in the fourth direction D4.

The second opposing substrate 310 may face the second array substrate 330. The second opposing substrate 310 may include a lens common electrode CE and a second alignment layer 310a. The second alignment layer 310a may be aligned along a second alignment direction. The second alignment direction of the second alignment layer 310a may be substantially parallel with the first alignment direction of the first alignment layer 330a. For example, the second alignment direction of the second alignment layer 310a may be substantially parallel with the fourth direction D4. The lens common electrode CE may have a flat plane shape without any slit pattern.

Although the present exemplary embodiment discloses that the liquid crystal lens panel 350 is disposed so that the second opposing substrate 310 is disposed adjacent to the display panel assembly 100, the dispositions of the liquid crystal lens panel 350 according to the present invention is not limited thereto. For example, dispositions of the second opposing substrate 310 and the second array substrate 330 may be altered with each other. In other words, in another exemplary embodiment, the liquid crystal lens panel 350 may be disposed so that the second array substrate 330 may be disposed adjacent to the display panel assembly 100.

The second liquid crystal layer 340 may be disposed between the second array substrate 330 and the second opposing substrate 310. Liquid crystals in the second liquid crystal layer 340 may be aligned along the fourth direction D4 by the first alignment layer 330a and the second alignment layer 310a.

The active driving part 360 may be configured to provide the liquid crystal lens panel 350 with voltages. More specifically, the active driving part 360 may apply voltages having a plurality of levels to the lens electrodes LE, thereby implementing liquid crystal lenses. The electrode groups may be configured to exhibit the liquid crystal lens units to form liquid crystal lenses.

For example, a common voltage may be applied to the lens common electrode CE on the second opposing substrate 310. The active driving part 360 may apply a plurality of voltages to the lens electrodes LE on the second array substrate 410, thereby forming a Fresnel lens having a desired distribution of refraction. In this case, the liquid crystal display panel 170 may display n-viewpoint images during a frame.

The third polarizer 380 may be disposed on the liquid crystal lens panel 350. The third polarizer 380 may polarize the light from the liquid crystal lens panel 350 toward a desired polarizing axis. For example, the third polarizer 380 may polarize the light from the liquid crystal lens panel 350 toward a third polarizing axis along the fourth direction D4 which is tilted by the first angle θ with respect to the second direction D2. The first angle θ may be greater than or equal to about +5 degrees and less than or equal to about +15 degrees. For example, the first angle θ may be substantially about +10 degrees.

Referring to FIG. 2, the light from the light source part 200 may be polarized through the first polarizer 180 to enter the liquid crystal display panel 170. The first polarizer 180 may have the first polarizing axis substantially parallel with the third direction D3. The pixel electrode PE in the liquid crystal display panel 170 may include an electrode pattern such as, e.g., a plurality of silts. The slits may be tilted by a second angle with respect to the third direction D3 or the fourth direction D4. The second angle may be in a range of greater than or equal to about 15 degrees and less than or equal to about 45 degrees. Liquid crystals 140a in the liquid crystal display panel 170 may be align to be substantially parallel with the electrode pattern. The light from the liquid crystal display panel 170 may be polarized through the second polarizer 190 to enter the liquid crystal lens panel 350. The second polarizer 190 may have the second polarizing axis substantially parallel with the fourth direction D4. The first alignment layer 330a, the second alignment layer 310a and the lens electrodes LE in the liquid crystal lens panel 350 may be substantially parallel with the fourth direction D4. The light from the liquid crystal lens panel 350 may be polarized through the third polarizer 380. The third polarizer 380 may have the third polarizing axis substantially parallel with the fourth direction D4.

As mentioned above, the first polarizing axis of the first polarizer 180 and the second polarizing axis of the second polarizer 190 may be substantially perpendicular to each other. In addition, the first alignment direction of the first alignment layer 330a, the second alignment direction of the second alignment layer 310a, an extending direction of the lens electrodes LE and the third polarizing axis of the third polarizer 380 may be substantially parallel with the second polarizing axis of the second polarizer 190, thereby reducing loss of light from the light source part 200 which may occur due to a discrepancy in the polarizing axes from the liquid crystal display panel 170 to the lens panel assembly 300. Accordingly, an overall luminance of a three-dimensional image may be improved.

Figure 3:
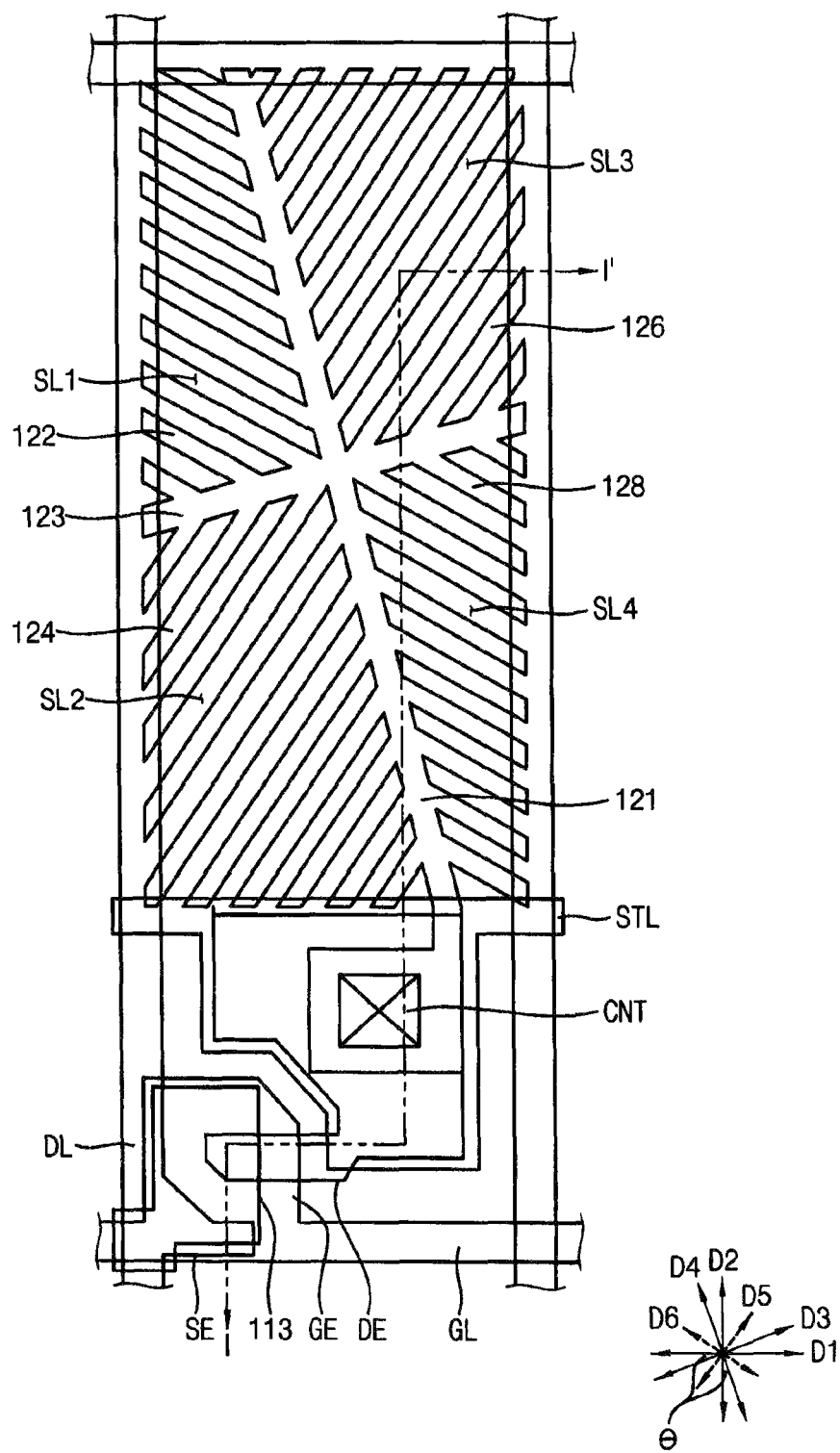
FIG. 3 is a plan view illustrating a pixel in an array substrate of a liquid crystal display panel of FIG. 2.
Figure 4:
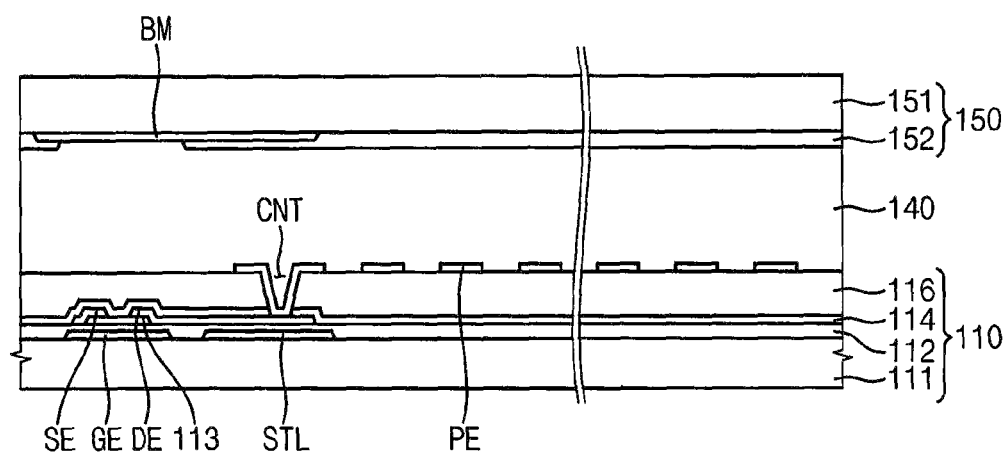
FIG. 4 is a cross-sectional view taken along a line I-I' of FIG. 3.

FIG. 3 is a plan view illustrating a pixel in an array substrate of a liquid crystal display panel of FIG. 2. FIG. 4 is a cross-sectional view taken along a line I-I' of FIG. 3.

Referring to FIG. 3 and FIG. 4, the liquid crystal display panel 170 may include the first array substrate 110, the first opposing substrate 150 and the first liquid crystal layer 140.

The first array substrate 110 may include a first base substrate 111, a gate line GL, a gate electrode GE, a storage line STL, a gate insulation layer 112, a semiconductor pattern 113, a data line DL, a source electrode SE, a drain electrode DE, a passivation layer 114, an organic insulation layer 116 and a pixel electrode PE.

The first base substrate 111 may include a transparent insulation material. For example, the first base substrate 111 may include glass, quartz, plastic, polyethylene terephthalate resin, polyethylene resin, polycarbonate resin, etc.

The gate line GL may extend in the first direction D1 on the first base substrate 111. The gate driving part 163 may be configured to apply gate on/off voltages to the gate line GL. The gate line GL may include, for example, aluminum (Al), gold (Au), silver (Ag), copper (Cu), iron (Fe), nickel (Ni), etc. Theses may be used alone or in a mixture thereof. The gate line GL may include, for example, indium doped zinc oxide (IZO), gallium doped zinc oxide (GZO), etc.

The gate electrode GE may be electrically connected to the gate line GL. The gate electrode GE may include, for example, a same material as the gate line GL. For example, the gate electrode GE may be integrally formed with the gate line GL.

The storage line STL may extend in a direction substantially parallel with the gate line GL. The storage line STL may partially overlap the pixel electrode PE and the drain electrode DE. A storage capacitor may be defined by the pixel electrode PE and the storage line STL. The gate insulation layer 112 and the passivation layer 114 may be disposed between the pixel electrode PE and the storage line STL.

The gate insulation layer 112 may be disposed on the first base substrate in which the gate line GL and the storage line STL are disposed. The gate insulation layer 112 may include a transparent material such as, for example, silicon oxide, silicon nitride, etc.

The semiconductor pattern 113 may be disposed on the gate insulation layer 112. The semiconductor pattern 113 may overlap the gate electrode GE. The semiconductor pattern 113 may include, for example, indium (In), zinc (Zn), gallium (Ga), tin (Sn), hafnium (Hf), etc. For example, the semiconductor pattern 113 may include an oxide semiconductor pattern such as, e.g., indium gallium zinc oxide (IGZO), indium tin zinc oxide (ITZO), hafnium indium zinc oxide (HIZO), etc.

The data line DL may be disposed on the gate insulation layer 112. The data line DL may extend in the second direction D2. The second direction D2 may be substantially perpendicular to the first direction D1. The data line DL and the gate line GL may define a pixel area. The data driving part 161 may be configured to apply a data voltage to the data line DL. The data line DL may include, e.g., a same material as the gate line GL. For example, the data line may include aluminum (Al), gold (Au), silver (Ag), copper (Cu), iron (Fe), nickel (Ni), etc. Theses may be used alone or in a mixture thereof.

The source electrode SE may be disposed on the gate insulation layer 112. The source electrode SE may overlap a first end portion of the semiconductor pattern 113. The source electrode SE may electrically connected to the data line DL. For example, the source electrode SE may be integrally formed with the data line DL.

The drain electrode DE may be spaced apart from the source electrode SE on the gate insulation layer 112. The drain electrode DE may overlap a second end portion of the semiconductor pattern 113. The drain electrode DE may include, e.g., a same material as the source electrode SE. For example, the source electrode SE and the drain electrode DE may include, e.g., aluminum (Al), gold (Au), silver (Ag), copper (Cu), iron (Fe), nickel (Ni), etc. Theses may be used alone or in a mixture thereof.

The passivation layer 114 may be disposed on the source electrode SE and the drain electrode DE. The passivation layer 114 may cover the source electrode SE and the drain electrode DE. The passivation layer 114 may include, e.g., a same material as the gate insulation layer 112. For example, the passivation layer 114 may include silicon oxide, silicon nitride, etc.

The organic insulation layer 116 may cover the passivation layer 114. The organic insulation layer 116 may have a substantially flat surface. The organic insulation layer 116 may include an organic insulation material such as, e.g., acryl resin, phenol resin, etc.

The pixel electrode PE may be disposed on the organic insulation layer 116. The pixel electrode PE may include a transparent conductive material. The pixel electrode PE may be electrically connected to the drain electrode DE through a contact hole CNT defined in the organic insulation layer 116 and the passivation layer 114. The pixel electrode may be formed of from semi-transparent material, transparent metal, transparent inorganic material such as indium tin oxide (ITO), fluorine doped tin oxide (FTO), gallium doped zinc oxide (GZO), and indium zinc oxide (IZO), and transparent organic material such as carbon nanotube networks and graphene.

The pixel electrode PE may include a plurality of branch electrode portions. The branch electrode portions may extend in different directions. The branch electrode portions may be connected to a connection electrode portion. The branch electrode portions may define a plurality of domains.

The connection electrode portion may include a first extending electrode portion 121. The first extending electrode portion 121 may extend in the fourth direction D4. The first extending electrode portion 121 may be tilted by the first angle θ with respect to the second direction D2. The first angle θ may be greater than or equal to about +5 degrees. The first angle θ may be less than or equal to about +15 degrees. For example, the first angle θ may be substantially about +10 degrees. The connection electrode portion may include a second extending electrode portion 123. The second electrode portion may extend in the third direction D3.

First branch electrode portions 122 among the branch electrode portions may be disposed in a first domain. The first domain may correspond to a second quadrant with respect to a portion at which the first extending electrode portion 121 and the second extending electrode portion 123 cross. The first branch electrode portions 122 may be spaced apart from each other forming first slits SL1. The first branch electrode portions 122 may extend in a sixth direction D6 from the first extending electrode portion 121 and the second extending electrode portion 123. The sixth direction D6 may be tilted from the fourth direction D4 by an angle in a range of greater than or equal to about 15 degrees and less than or equal to about 45 degrees. For example, the first branch electrode portions 122 may be tilted by about 45 degrees with respect to the third direction D3 and the fourth direction D4. For example, the first branch electrode portions 122 may be tilted by about 145 degrees with respect to the first direction D1. The first electrode portions 122 may be tilted by about 55 degrees with respect to the second direction D2.

Second branch electrode portions 124 among the branch electrode portions may be disposed in a second domain. The second domain may correspond to a third quadrant with respect to the portion at which the first extending electrode portion 121 and the second extending electrode portion 123 cross. The second branch electrode portions 124 may be spaced apart from each other forming second slits SL2. The second branch electrode portions 124 may extend in a fifth direction D5 from the first extending electrode portion 121 and the second extending electrode portion 123. The fifth direction D5 may be substantially perpendicular to the sixth direction D6. For example, the second branch electrode portions 124 may be tilted by about 45 degrees with respect to the third direction D3 and the fourth direction D4. For example, the second branch electrode portions 124 may be tilted by about 55 degrees with respect to the first direction D1. The second electrode portions 124 may be tilted by about 145 degrees with respect to the second direction D2.

Third branch electrode portions 126 among the branch electrode portions may be disposed in a third domain. The third domain may correspond to a first quadrant with respect to the portion at which the first extending electrode portion 121 and the second extending electrode portion 123 cross. The third branch electrode portions 126 may be spaced apart from each other forming third slits SL3. The third branch electrode portions 126 may extend in the fifth direction D5 from the first extending electrode portion 121 and the second extending electrode portion 123. For example, the third branch electrode portions 126 may be tilted by about 45 degrees with respect to the third direction D3 and the fourth direction D4. For example, the third branch electrode portions 126 may be tilted by about 55 degrees with respect to the first direction D1. The third electrode portions 126 may be tilted by about 145 degrees with respect to the second direction D2.

Fourth branch electrode portions 128 among the branch electrode portions may be disposed in a fourth domain. The fourth domain may correspond to a fourth quadrant with respect to the portion at which the first extending electrode portion 121 and the second extending electrode portion 123 cross. The fourth branch electrode portions 128 may be spaced apart from each other forming fourth slits SL4. The fourth branch electrode portions 128 may extend in the sixth direction D6 from the first extending electrode portion 121 and the second extending electrode portion 123. For example, the fourth branch electrode portions 128 may be tilted by about 45 degrees with respect to the third direction D3 and the fourth direction D4. For example, the fourth branch electrode portions 128 may be tilted by about 145 degrees with respect to the first direction D1. The fourth electrode portions 128 may be tilted by about 55 degrees with respect to the second direction D2.

In the present exemplary embodiment, widths of the first slits SL1 to the fourth slits SL4 may be substantially the same as each other. Alternatively, the widths of the first slits SL1 to the fourth slits SL4 may be different from each other. The widths of the first slits SL1 to the fourth slits SL4 may be equal to or greater than widths of the first branch electrode portions 122 to the fourth branch electrode portions 128. For example, the widths of the first branch electrode portions 122 to the fourth branch electrode portions 128 may be in a range from about 1 μm to about 10 μm.

Areas of the first domain to the fourth domain may be different from each other. For example, areas of the first domain and the fourth domain may be smaller than areas of the second domain and the third domain, respectively.

The first opposing substrate 150 may face the first array substrate 110. The first opposing substrate 150 may include a second base substrate 151, a light blocking pattern BM and a color filter layer 152.

The second base substrate 151 may include a transparent insulation material. For example, the second base substrate 151 may include, glass, quartz, plastic, polyethylene terephthalate resin, polyethylene resin, polycarbonate resin, etc.

The light blocking pattern BM may overlap the gate line GL, the data line DL, the gate electrode GE, the source electrode SE and/or the drain electrode DE. The light blocking pattern BM may include an organic material or an inorganic material which absorbs light. For example, the light blocking pattern BM may include carbon black (CB), titan black (TiBK), chromium (Cr), chromium oxide, chromium nitride, etc.

The color filter layer 152 may overlap the pixel electrode PE.

The first liquid crystal layer 140 may be disposed between the first array substrate 110 and the first opposing substrate 150.

As mentioned above, in a three-dimensional image display device according to the present exemplary embodiment, the electrode pattern of the pixel electrode PE in the liquid crystal display panel 170 may be tilted by an angle with respect to an extending direction of lens electrodes LE in the liquid crystal lens panel 350 instead of an extending direction of the gate line GL and/or the data line DL, thereby reducing moiré phenomenon which may occur due to a light blocking pattern BM overlapping the gate line GL and/or the date line DL. Also, loss of light from the light source part 200 may be reduced which may occur due to the polarizing axis crossing a transmitting axis.

Figure 5:
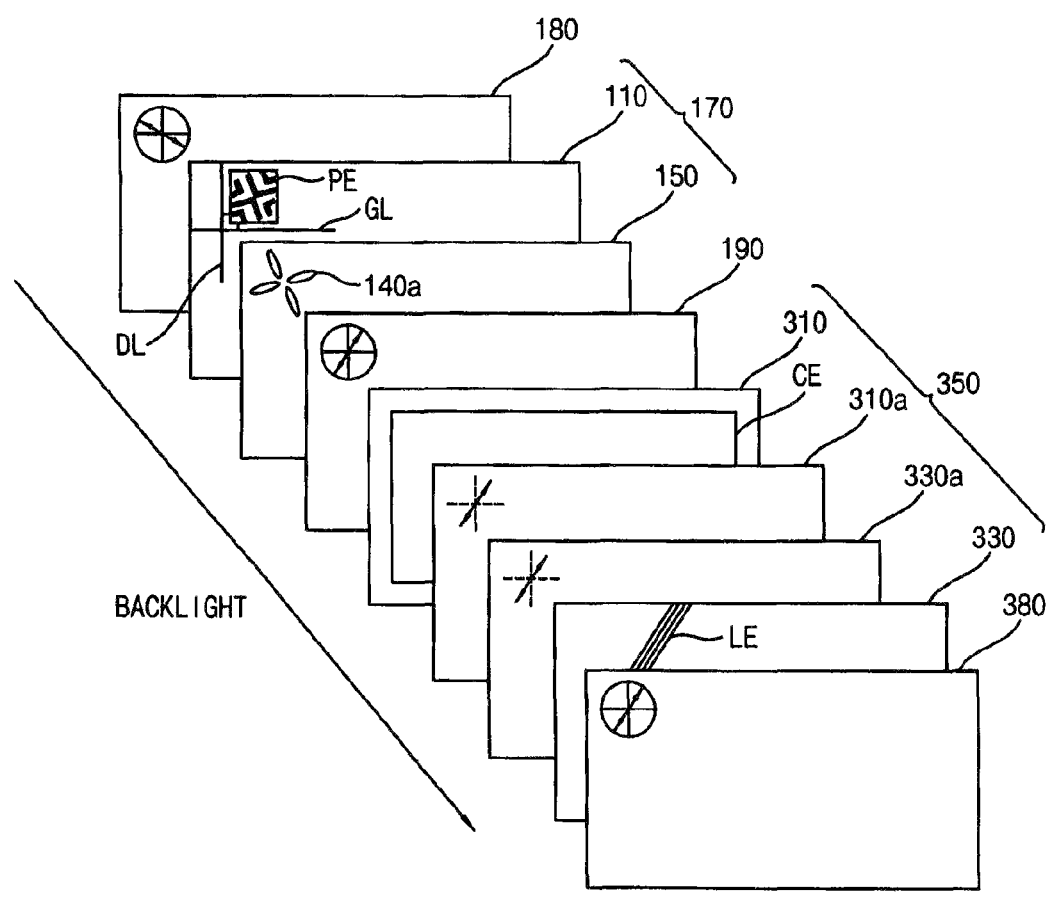
FIG. 5 is an exploded perspective view illustrating a display panel assembly and a lens panel assembly in a three-dimensional image display device according to an exemplary embodiment of the invention.

FIG. 5 is an exploded perspective view illustrating a display panel assembly and a lens panel assembly in a three-dimensional image display device according to an exemplary embodiment of the invention.

Referring to FIG. 5, a three-dimensional image display device according to the present exemplary embodiment is substantially the same as the three-dimensional image display device illustrated in FIG. 2 except polarizing axes of polarizers, alignment directions of alignment layers, an extending direction of lens electrodes and an electrode pattern of a pixel electrode. Hereinafter, details of the identical elements may be omitted or briefly described.

A display panel assembly may include a liquid crystal display panel 170, a first polarizer 180 and a second polarizer 190. The first polarizer 180 may be disposed under the liquid crystal display panel 170. The second polarizer 190 may be disposed on the liquid crystal display panel 170.

The liquid crystal display panel 170 may include a first array substrate 110, a first opposing substrate 150 and a first liquid crystal layer.

The first array substrate 110 may include a plurality of gate lines GL, a plurality of data lines DL and a plurality of pixel electrodes PE. The gate lines GL may extend in a first direction D1. The gate lines GL may be arranged in a second direction D2 substantially perpendicular to the first direction D1. The data lines DL may extend in the second direction D2. The data lines DL may be arranged in the first direction D1. The pixel electrodes PE may be electrically connected to the gate lines GL and the data lines DL through switching elements, respectively. The pixel electrodes PE may be disposed in pixel areas. Each of the pixel electrodes PE may include an electrode pattern having a plurality of silts. The electrode pattern of the pixel electrodes PE may be described in detail referring to FIG. 6.

The first opposing substrate 150 may face the first array substrate 110. The first liquid crystal layer may be disposed between the first array substrate 110 and the first opposing substrate 150. The first opposing substrate 150 may include a light blocking pattern. The light blocking pattern may overlap the gate lines GL and/or the data lines DL. The first opposing substrate 150 may include a plurality of color filters which overlaps the pixel areas. In another exemplary embodiment, the first array substrate 110, instead of the first opposing substrate 150, may include the light blocking pattern and/or the color filters. The first opposing substrate 150 may further include a pixel common electrode configured to form a vertical electric field with the pixel electrodes PE of the first array substrate 110. In another exemplary embodiment, the first array substrate 110, instead of the first opposing substrate 150, may include the pixel common electrode configure to form a horizontal electric field with the pixel electrodes PE.

A first polarizer 180 may be disposed between the liquid crystal display panel 170 and a light source part. The first polarizer 180 may polarize the light from the light source part toward a first polarizing axis along a third direction D3 which is tilted by a first angle θ with respect to the first direction D1. The first angle θ may be greater than or equal to about −15 degrees and less than or equal to −5 degrees. For example, the first angle θ may be substantially about −10 degrees.

The second polarizer 190 may be disposed between the liquid crystal display panel 170 and a lens panel assembly. The second polarizer 190 may polarize the light from the liquid crystal display panel 170 toward a second polarizing axis along a fourth direction D4 which is tilted by the first angle θ with respect to the second direction D2. The first angle θ may be greater than or equal to about −15 degrees and less than or equal to −5 degrees. For example, the first angle θ may be substantially about −10 degrees. The fourth direction D4 may be substantially perpendicular to the third direction D3.

The lens panel assembly may include a liquid crystal lens panel 350 and a third polarizer 380.

The liquid crystal lens panel 350 may include a second array substrate 330, a second opposing substrate 310 and a second liquid crystal layer.

The second array substrate 330 may include a plurality of lens electrodes LE and a first alignment layer 330a. The first alignment layer 330a may be aligned along a first alignment direction. The first alignment direction may be substantially parallel with a direction in which the lens electrodes LE extend. The lens electrodes LE may extend in the fourth direction D4.

The second opposing substrate 310 may face the second array substrate 330. The second opposing substrate 310 may include a lens common electrode CE and a second alignment layer 310a. The second alignment layer 310a may be aligned along a second alignment direction. The second alignment direction of the second alignment layer 310a may be substantially parallel with the first alignment direction of the first alignment layer 330a. For example, the second alignment direction of the second alignment layer 310a may be substantially parallel with the fourth direction D4. The lens common electrode CE may have a flat plane shape without any slit pattern.

The second liquid crystal layer may be disposed between the second array substrate 330 and the second opposing substrate 310. Liquid crystals in the second liquid crystal layer may be aligned along the fourth direction D4 by the first alignment layer 330a and the second alignment layer 310a.

The third polarizer 380 may be disposed on the liquid crystal lens panel 350. The third polarizer 380 may polarize the light from the liquid crystal lens panel 350 toward a desired polarizing axis. For example, the third polarizer 380 may polarize the light from the liquid crystal lens panel 350 toward a third polarizing axis along the fourth direction D4 which is tilted by the first angle θ with respect to the second direction D2. The first angle θ may be greater than or equal to about −15 degrees and less than or equal to about −5 degrees. For example, the first angle θ may be substantially about −10 degrees.

Referring to FIG. 5, the light from the light source part may be polarized through the first polarizer 180 to enter the liquid crystal display panel 170. The first polarizer 180 may have the first polarizing axis substantially parallel with the third direction D3. The pixel electrode PE in the liquid crystal display panel 170 may include an electrode pattern such as, e.g., a plurality of silts. The slits may be tilted by a second angle with respect to the third direction D3 or the fourth direction D4. The second angle may be in a range of greater than or equal to about 15 degrees and less than or equal to about 45 degrees. Liquid crystals 140a in the liquid crystal display panel 170 may be align to be substantially parallel with the electrode pattern. The light from the liquid crystal display panel 170 may be polarized through the second polarizer 190 to enter the liquid crystal lens panel 350. The second polarizer 190 may have the second polarizing axis substantially parallel with the fourth direction D4. The first alignment layer 330a, the second alignment layer 310a and the lens electrodes LE in the liquid crystal lens panel 350 may be substantially parallel with the fourth direction D4. The light from the liquid crystal lens panel 350 may be polarized through the third polarizer 380. The third polarizer 380 may have the third polarizing axis substantially parallel with the fourth direction D4.

As mentioned above, the first polarizing axis of the first polarizer 180 and the second polarizing axis of the second polarizer 190 may be substantially perpendicular to each other. In addition, the first alignment direction of the first alignment layer 330a, the second alignment direction of the second alignment layer 310a, an extending direction of the lens electrodes LE and the third polarizing axis of the third polarizer 380 may be substantially parallel with the second polarizing axis of the second polarizer 190, thereby reducing loss of light from the light source part which may occur due to a discrepancy in the polarizing axes from the liquid crystal display panel 170 to the lens panel assembly 300. Accordingly, an overall luminance of a three-dimensional image may be improved.

Figure 6:
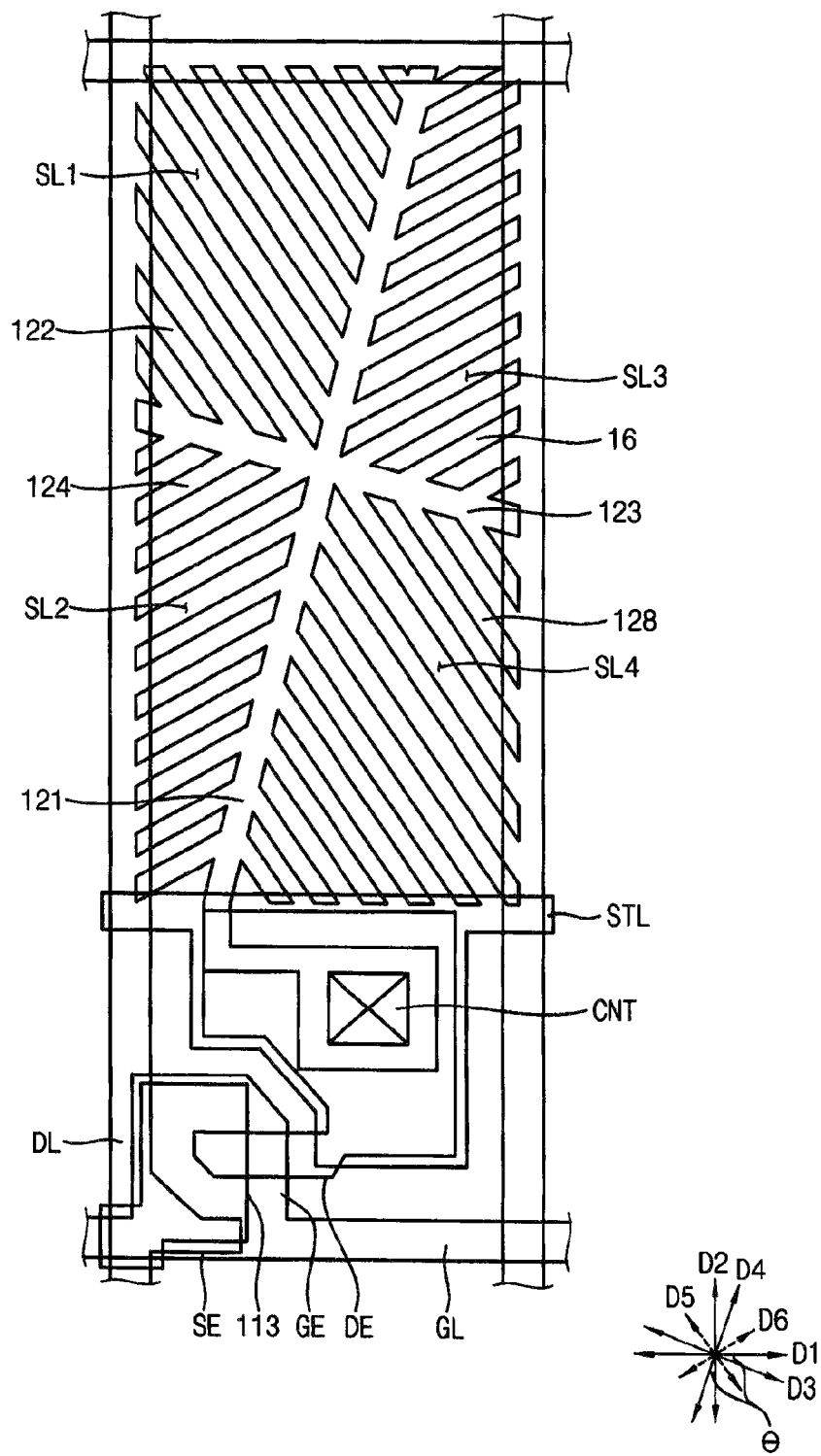
FIG. 6 is a plan view illustrating a pixel in an array substrate of a liquid crystal display panel of FIG. 5.

FIG. 6 is a plan view illustrating a pixel in an array substrate of a liquid crystal display panel of FIG. 5.

Referring to FIG. 6, a pixel in the first array substrate in the liquid crystal display panel of a three-dimensional image display device according to the present exemplary embodiment may be substantially the same as the pixel in the first array substrate in the liquid crystal display panel illustrated in FIG. 3 except extending directions of a connection electrode portion and branch electrode portions. Hereinafter, details of the identical elements may be omitted or briefly described.

The first array substrate 110 may include a first base substrate, a gate line GL, a gate electrode GE, a storage line STL, a gate insulation layer, a semiconductor pattern 113, a data line DL, a source electrode SE, a drain electrode DE, a passivation layer, an organic insulation layer and a pixel electrode PE.

The first base substrate may include a transparent insulation material.

The gate line GL may extend in the first direction D1 on the first base substrate.

The gate electrode GE may be electrically connected to the gate line GL. For example, the gate electrode GE may be integrally formed with the gate line GL.

The storage line STL may extend in a direction substantially parallel with the gate line GL. The storage line STL may partially overlap the pixel electrode PE and the drain electrode DE.

The gate insulation layer may be disposed on the first base substrate in which the gate line GL and the storage line STL are disposed.

The semiconductor pattern 113 may be disposed on the gate insulation layer. The semiconductor pattern 113 may overlap the gate electrode GE.

The data line DL may be disposed on the gate insulation layer. The data line DL may extend in the second direction D2. The second direction D2 may be substantially perpendicular to the first direction D1.

The source electrode SE may be disposed on the gate insulation layer. The source electrode SE may overlap a first end portion of the semiconductor pattern 113. The source electrode SE may electrically connected to the data line DL. For example, the source electrode SE may be integrally formed with the data line DL.

The drain electrode DE may be spaced apart from the source electrode SE on the gate insulation layer. The drain electrode DE may overlap a second end portion of the semiconductor pattern 113.

The passivation layer may cover the source electrode SE and the drain electrode DE.

The organic insulation layer may cover the passivation layer.

The pixel electrode PE may be disposed on the organic insulation layer. The pixel electrode PE may include a transparent conductive material. The pixel electrode PE may be electrically connected to the drain electrode DE through a contact hole defined in the organic insulation layer and the passivation layer.

The pixel electrode PE may include a plurality of branch electrode portions. The branch electrode portions may extend in different directions. The branch electrode portions may be connected to a connection electrode portion. The branch electrode portions may define a plurality of domains.

The connection electrode portion may include a first extending electrode portion 121. The first extending electrode portion 121 may extend in the fourth direction D4. The first extending electrode portion 121 may be tilted by the first angle θ with respect to the second direction D2. The first angle θ may be greater than or equal to about −15 degrees. The first angle θ may be less than or equal to about −5 degrees. For example, the first angle θ may be substantially about −10 degrees. The connection electrode portion may include a second extending electrode portion 123. The second extending electrode portion 123 may extend in the third direction D3.

First branch electrode portions 122 among the branch electrode portions may be disposed in a first domain. The first domain may correspond to a second quadrant with respect to a portion at which the first extending electrode portion 121 and the second extending electrode portion 123 cross. The first branch electrode portions 122 may be spaced apart from each other forming first slits SL1. The first branch electrode portions 122 may extend in a fifth direction D5 from the first extending electrode portion 121 and the second extending electrode portion 123. The fifth direction D5 may be tilted from the fourth direction D4 by an angle in a range of greater than or equal to about 15 degrees and less than or equal to about 45 degrees. For example, the first branch electrode portions 122 may be tilted by about 45 degrees with respect to the third direction D3 and the fourth direction D4. For example, the first branch electrode portions 122 may be tilted by about 125 degrees with respect to the first direction D1. The first electrode portions 122 may be tilted by about 35 degrees with respect to the second direction D2.

Second branch electrode portions 124 among the branch electrode portions may be disposed in a second domain. The second domain may correspond to a third quadrant with respect to the portion at which the first extending electrode portion 121 and the second extending electrode portion 123 cross. The second branch electrode portions 124 may be spaced apart from each other forming second slits SL2. The second branch electrode portions 124 may extend in a sixth direction D6 from the first extending electrode portion 121 and the second extending electrode portion 123. The sixth direction D6 may be substantially perpendicular to the fifth direction D5. For example, the second branch electrode portions 124 may be tilted by about 45 degrees with respect to the third direction D3 and the fourth direction D4. For example, the second branch electrode portions 124 may be tilted by about 35 degrees with respect to the first direction D1. The second electrode portions 124 may be tilted by about 125 degrees with respect to the second direction D2.

Third branch electrode portions 126 among the branch electrode portions may be disposed in a third domain. The third domain may correspond to a first quadrant with respect to the portion at which the first extending electrode portion 121 and the second extending electrode portion 123 cross. The third branch electrode portions 126 may be spaced apart from each other forming third slits SL3. The third branch electrode portions 126 may extend in the sixth direction D6 from the first extending electrode portion 121 and the second extending electrode portion 123. For example, the third branch electrode portions 126 may be tilted by about 45 degrees with respect to the third direction D3 and the fourth direction D4. For example, the third branch electrode portions 126 may be tilted by about 35 degrees with respect to the first direction D1. The third electrode portions 126 may be tilted by about 125 degrees with respect to the second direction D2.

Fourth branch electrode portions 128 among the branch electrode portions may be disposed in a fourth domain. The fourth domain may correspond to a fourth quadrant with respect to the portion at which the first extending electrode portion 121 and the second extending electrode portion 123 cross. The fourth branch electrode portions 128 may be spaced apart from each other forming fourth slits SL4. The fourth branch electrode portions 128 may extend in the fifth direction D5 from the first extending electrode portion 121 and the second extending electrode portion 123. For example, the fourth branch electrode portions 128 may be tilted by about 45 degrees with respect to the third direction D3 and the fourth direction D4. For example, the fourth branch electrode portions 128 may be tilted by about 125 degrees with respect to the first direction D1. The fourth electrode portions 128 may be tilted by about 35 degrees with respect to the second direction D2.

In the present exemplary embodiment, widths of the first slits SL1 to the fourth slits SL4 may be substantially the same as each other. Alternatively, the widths of the first slits SL1 to the fourth slits SL4 may be different from each other. The widths of the first slits SL1 to the fourth slits SL4 may be equal to or greater than widths of the first branch electrode portions 122 to the fourth branch electrode portions 128. For example, the widths of the first branch electrode portions 122 to the fourth branch electrode portions 128 may be in a range from about 1 μm to about 10 μm.

Areas of the first domain to the fourth domain may be different from each other. For example, areas of the first domain and the fourth domain may be greater than areas of the second domain and the third domain, respectively.

As mentioned above, in a three-dimensional image display device according to the present exemplary embodiment, the electrode pattern of the pixel electrode PE in the liquid crystal display panel 170 may be tilted by an angle with respect to an extending direction of lens electrodes LE in the liquid crystal lens panel 350 instead of an extending direction of the gate line GL and/or the data line DL, thereby reducing moiré phenomenon which may occur due to a light blocking pattern overlapping the gate line GL and/or the date line DL. Also, loss of light from the light source part may be reduced which may occur due to the polarizing axis crossing a transmitting axis.

Figure 7:
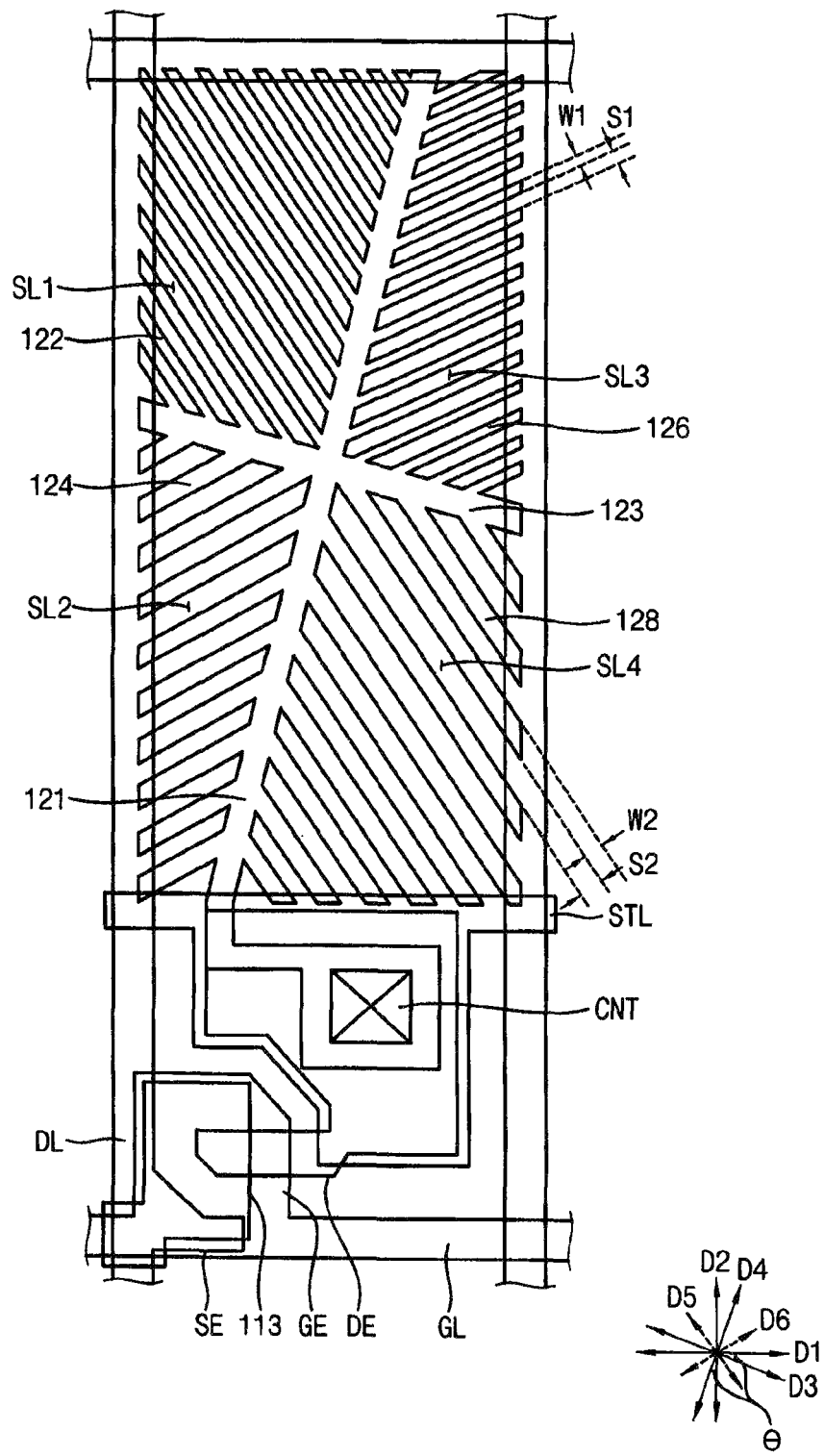
FIG. 7 is a plan view illustrating a pixel in an array substrate of a liquid crystal display panel in a three-dimensional image display device according to an exemplary embodiment of the invention.

FIG. 7 is a plan view illustrating a pixel in an array substrate of a liquid crystal display panel in a three-dimensional image display device according to an exemplary embodiment of the invention.

Referring to FIG. 7, a pixel in an array substrate in a liquid crystal display panel of a three-dimensional image display device according to the present exemplary embodiment may be substantially the same as the pixel in the first array substrate in the liquid crystal display panel illustrated in FIG. 6 except widths of branch electrode portions. Hereinafter, details of the identical elements may be omitted or briefly described.

A pixel electrode PE may include a plurality of branch electrode portions. The branch electrode portions may extend in different directions. The branch electrode portions may be connected to a connection electrode portion. The branch electrode portions may define a plurality of domains.

The connection electrode portion may include a first extending electrode portion 121. The first extending electrode portion 121 may extend in a fourth direction D4. The first extending electrode portion 121 may be tilted by a first angle θ with respect to a second direction D2 in which a data line extend. The first angle θ may be greater than or equal to about −15 degrees. The first angle θ may be less than or equal to about −5 degrees. For example, the first angle θ may be substantially about −10 degrees. The connection electrode portion may include a second extending electrode portion 123. The second extending electrode portion 123 may extend in a third direction D3 substantially perpendicular to the fourth direction D4.

First branch electrode portions 122 among the branch electrode portions may be disposed in a first domain. The first domain may correspond to a second quadrant with respect to a portion at which the first extending electrode portion 121 and the second extending electrode portion 123 cross. Each of the first branch electrode portions 122 may have a first width W1. The first branch electrode portions 122 may be spaced apart from each other forming first slits SL1. Each of the first slits SL1 may have a second width S1. The second width S1 may be substantially equal to or greater than the first width W1. The first width W1 may be, for example, in a range from about 1 μm to about 2.5 μm. The first branch electrode portions 122 may extend in a fifth direction D5 from the first extending electrode portion 121 and the second extending electrode portion 123. The fifth direction D5 may be tilted from the fourth direction D4 by an angle in a range of greater than or equal to about 15 degrees and less than or equal to about 45 degrees. For example, the first branch electrode portions 122 may be tilted by about 45 degrees with respect to the third direction D3 and the fourth direction D4. For example, the first branch electrode portions 122 may be tilted by about 125 degrees with respect to the first direction D1. The first electrode portions 122 may be tilted by about 35 degrees with respect to the second direction D2.

Second branch electrode portions 124 among the branch electrode portions may be disposed in a second domain. The second domain may correspond to a third quadrant with respect to the portion at which the first extending electrode portion 121 and the second extending electrode portion 123 cross. Each of the second branch electrode portions 124 may have a third width W2. The second branch electrode portions 124 may be spaced apart from each other forming second slits SL2. Each of the second slits SL2 may have a fourth width S2. The fourth slits S2 may be substantially equal to or greater than the third width W2. For example, the third width W2 may be, for example, in a range from about 2.5 μm to about 8.0 μm. The second branch electrode portions 124 may extend in a sixth direction D6 from the first extending electrode portion 121 and the second extending electrode portion 123. The sixth direction D6 may be substantially perpendicular to the fifth direction D5. For example, the second branch electrode portions 124 may be tilted by about 45 degrees with respect to the third direction D3 and the fourth direction D4. For example, the second branch electrode portions 124 may be tilted by about 35 degrees with respect to the first direction D1. The second electrode portions 124 may be tilted by about 125 degrees with respect to the second direction D2.

Third branch electrode portions 126 among the branch electrode portions may be disposed in a third domain. The third domain may correspond to a first quadrant with respect to the portion at which the first extending electrode portion 121 and the second extending electrode portion 123 cross. Each of the third branch electrode portions 126 may have the first width W1. The third branch electrode portions 126 may be spaced apart from each other forming third slits SL3. Each of the third slits SL3 may have the second width S1. The second width S1 may be substantially equal to or greater than the first width W1. The first width W1 may be, for example, in a range from about 1.0 µm to about 2.5 µm. The third branch electrode portions 126 may extend in the sixth direction D6 from the first extending electrode portion 121 and the second extending electrode portion 123. For example, the third branch electrode portions 126 may be tilted by about 45 degrees with respect to the third direction D3 and the fourth direction D4. For example, the third branch electrode portions 126 may be tilted by about 35 degrees with respect to the first direction D1. The third electrode portions 126 may be tilted by about 125 degrees with respect to the second direction D2.

Fourth branch electrode portions 128 among the branch electrode portions may be disposed in a fourth domain. The fourth domain may correspond to a fourth quadrant with respect to the portion at which the first extending electrode portion 121 and the second extending electrode portion 123 cross. Each of the fourth branch electrode portions 128 may have the third width W2. The fourth branch electrode portions 128 may be spaced apart from each other forming fourth slits SL4. Each of the fourth slits SL4 may have the fourth width S2. The fourth slits S2 may be substantially equal to or greater than the third width W2. For example, the third width W2 may be, for example, in a range from about 2.5 µm to about 8.0 µm. The fourth branch electrode portions 128 may extend in the fifth direction D5 from the first extending electrode portion 121 and the second extending electrode portion 123. For example, the fourth branch electrode portions 128 may be tilted by about 45 degrees with respect to the third direction D3 and the fourth direction D4. For example, the fourth branch electrode portions 128 may be tilted by about 125 degrees with respect to the first direction D1. The fourth electrode portions 128 may be tilted by about 35 degrees with respect to the second direction D2.

In the present exemplary embodiment, widths of the first slits SL1 to the fourth slits SL4 may be different from each other in the domains. Also, widths of the first branch electrode portions 122 to the fourth branch electrode portions 128 may be different from each other in the domains.

Figure 8:
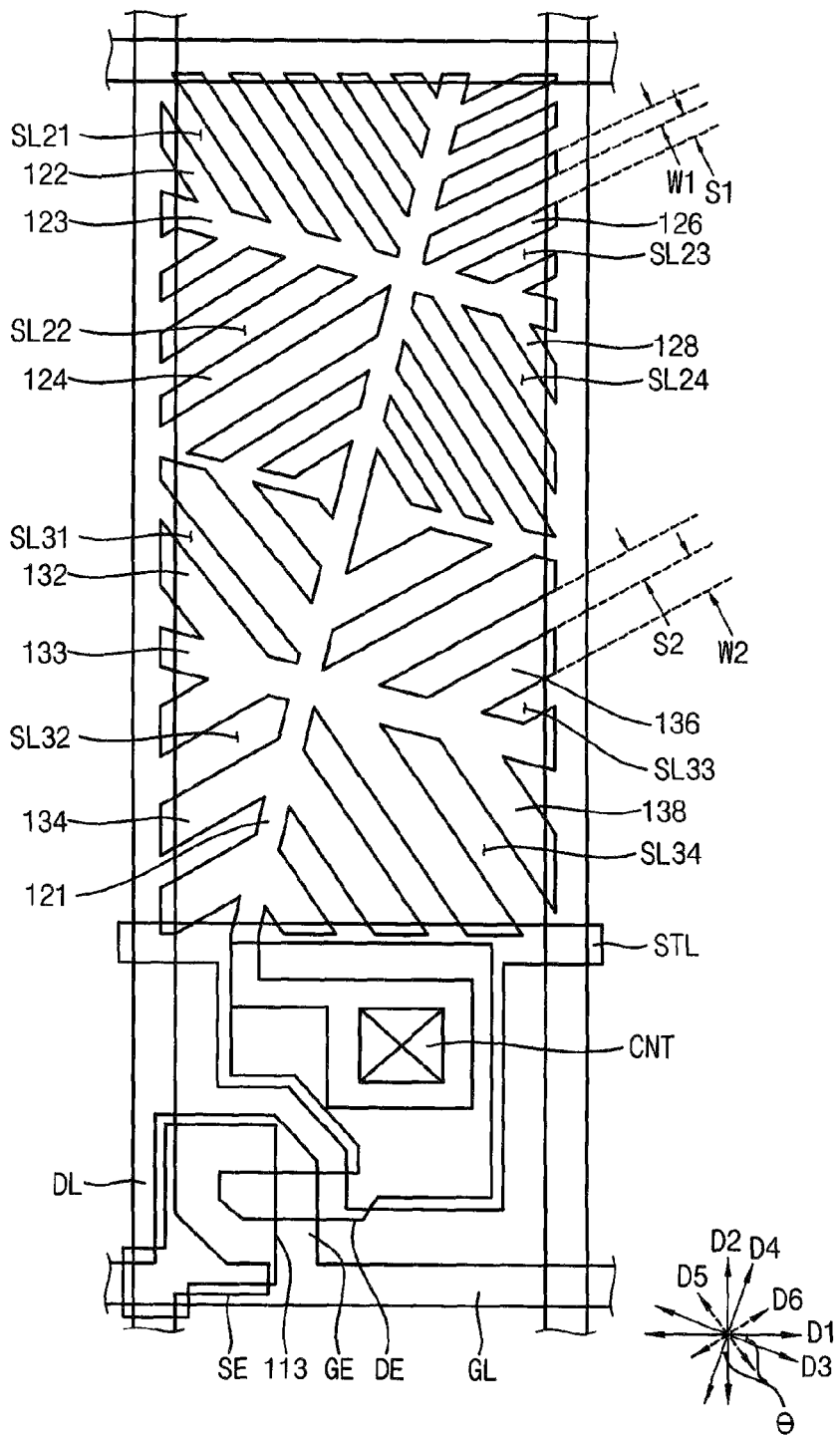
FIG. 8 is a plan view illustrating a pixel in an array substrate of a liquid crystal display panel in a three-dimensional image display device according to an exemplary embodiment of the invention.

FIG. 8 is a plan view illustrating a pixel in an array substrate of a liquid crystal display panel in a three-dimensional image display device according to an exemplary embodiment of the invention.

Referring to FIG. 8, a pixel in an array substrate in a liquid crystal display panel of a three-dimensional image display device according to the present exemplary embodiment may be substantially the same as the pixel in the array substrate in the liquid crystal display panel illustrated in FIG. 7 except a number of domains defined by branch electrode portions. Hereinafter, details of the identical elements may be omitted or briefly described.

A pixel electrode PE may include a plurality of branch electrode portions. The branch electrode portions may extend in different directions. The branch electrode portions may be connected to a connection electrode portion. The branch electrode portions may define a plurality of domains.

The connection electrode portion may include a first extending electrode portion 121. The first extending electrode portion 121 may extend in a fourth direction D4. The first extending electrode portion 121 may be tilted by a first angle θ with respect to a second direction D2 in which a data line extend. The first angle θ may be greater than or equal to about −15 degrees. The first angle θ may be less than or equal to about −5 degrees. For example, the first angle θ may be substantially about −10 degrees. The connection electrode portion may include a second extending electrode portion 123 and a third extending electrode portion 133. The second extending electrode portion 123 and the third extending electrode portion 133 may extend in a third direction D3 substantially perpendicular to the fourth direction D4.

First branch electrode portions 122 among the branch electrode portions may be disposed in a first domain. The first domain may correspond to a second quadrant with respect to a portion at which the first extending electrode portion 121 and the second extending electrode portion 123 cross. Each of the first branch electrode portions 122 may have a first width W1. The first branch electrode portions 122 may be spaced apart from each other forming first slits SL21. Each of the first slits SL21 may have a second width S1. The second width S1 may be substantially equal to or greater than the first width W1. The first width W1 may be, for example, in a range from about 1.0 µm to about 2.5 µm. The first branch electrode portions 122 may extend in a fifth direction D5 from the first extending electrode portion 121 and the second extending electrode portion 123. The fifth direction D5 may be tilted from the fourth direction D4 by an angle in a range of greater than or equal to about 15 degrees and less than or equal to about 45 degrees. For example, the first branch electrode portions 122 may be tilted by about 45 degrees with respect to the third direction D3 and the fourth direction D4. For example, the first branch electrode portions 122 may be tilted by about 125 degrees with respect to the first direction D1. The first electrode portions 122 may be tilted by about 35 degrees with respect to the second direction D2.

Second branch electrode portions 124 among the branch electrode portions may be disposed in a second domain. The second domain may correspond to a third quadrant with respect to the portion at which the first extending electrode portion 121 and the second extending electrode portion 123 cross. Each of the second branch electrode portions 124 may have the first width W1. The second branch electrode portions 124 may be spaced apart from each other forming second slits SL22. Each of the second slits SL22 may have the second width S1. The second branch electrode portions 124 may extend in a sixth direction D6 from the first extending electrode portion 121 and the second extending electrode portion 123. The sixth direction D6 may be substantially perpendicular to the fifth direction D5. For example, the second branch electrode portions 124 may be tilted by about 45 degrees with respect to the third direction D3 and the fourth direction D4. For example, the second branch electrode portions 124 may be tilted by about 35 degrees with respect to the first direction D1. The second electrode portions 124 may be tilted by about 125 degrees with respect to the second direction D2.

Third branch electrode portions 126 among the branch electrode portions may be disposed in a third domain. The third domain may correspond to a first quadrant with respect to the portion at which the first extending electrode portion 121 and the second extending electrode portion 123 cross. Each of the third branch electrode portions 126 may have the first width W1. The third branch electrode portions 126 may be spaced apart from each other forming third slits SL23. Each of the third slits SL23 may have the second width S1. The third branch electrode portions 126 may extend in the sixth direction D6 from the first extending electrode portion 121 and the second extending electrode portion 123. For example, the third branch electrode portions 126 may be tilted by about 45 degrees with respect to the third direction D3 and the fourth direction D4. For example, the third branch electrode portions 126 may be tilted by about 35 degrees with respect to the first direction D1. The third electrode portions 126 may be tilted by about 125 degrees with respect to the second direction D2.

Fourth branch electrode portions 128 among the branch electrode portions may be disposed in a fourth domain. The fourth domain may correspond to a fourth quadrant with respect to the portion at which the first extending electrode portion 121 and the second extending electrode portion 123 cross. Each of the fourth branch electrode portions 128 may have the first width W1. The fourth branch electrode portions 128 may be spaced apart from each other forming fourth slits SL24. Each of the fourth slits SL24 may have the second width S1. The fourth branch electrode portions 128 may extend in the fifth direction D5 from the first extending electrode portion 121 and the second extending electrode portion 123. For example, the fourth branch electrode portions 128 may be tilted by about 45 degrees with respect to the third direction D3 and the fourth direction D4. For example, the fourth branch electrode portions 128 may be tilted by about 125 degrees with respect to the first direction D1. The fourth electrode portions 128 may be tilted by about 35 degrees with respect to the second direction D2.

Fifth branch electrode portions 132 among the branch electrode portions may be disposed in a fifth domain. The fifth domain may correspond to a second quadrant with respect to a portion at which the first extending electrode portion 121 and the third extending electrode portion 133 cross. Each of the fifth branch electrode portions 132 may have a third width W2. The fifth branch electrode portions 132 may be spaced apart from each other forming fifth slits SL31. Each of the fifth slits SL31 may have a fourth width S2. The fourth width S2 may be substantially equal to or greater than the third width W2. The third width W2 may be, for example, in a range from about 2.5 μm to about 8.0 μm. The fifth branch electrode portions 132 may extend in the fifth direction D5 from the first extending electrode portion 121 and the third extending electrode portion 133. For example, the fifth branch electrode portions 132 may be tilted by about 45 degrees with respect to the third direction D3 and the fourth direction D4. For example, the fifth branch electrode portions 132 may be tilted by about 125 degrees with respect to the first direction D1. The fifth electrode portions 132 may be tilted by about 35 degrees with respect to the second direction D2.

Sixth branch electrode portions 134 among the branch electrode portions may be disposed in a sixth domain. The sixth domain may correspond to a third quadrant with respect to the portion at which the first extending electrode portion 121 and the third extending electrode portion 133 cross. Each of the sixth branch electrode portions 134 may have the third width W2. The sixth branch electrode portions 134 may be spaced apart from each other forming sixth slits SL32. Each of the sixth slits SL32 may have the fourth width S2. The sixth branch electrode portions 134 may extend in the sixth direction D6 from the first extending electrode portion 121 and the third extending electrode portion 133. For example, the sixth branch electrode portions 134 may be tilted by about 45 degrees with respect to the third direction D3 and the fourth direction D4. For example, the sixth branch electrode portions 134 may be tilted by about 35 degrees with respect to the first direction D1. The sixth electrode portions 134 may be tilted by about 125 degrees with respect to the second direction D2.

Seventh branch electrode portions 136 among the branch electrode portions may be disposed in a seventh domain. The seventh domain may correspond to a first quadrant with respect to the portion at which the first extending electrode portion 121 and the third extending electrode portion 133 cross. Each of the seventh branch electrode portions 136 may have the third width W2. The seventh branch electrode portions 136 may be spaced apart from each other forming seventh slits SL33. Each of the seventh slits SL33 may have the fourth width S2. The seventh branch electrode portions 136 may extend in the sixth direction D6 from the first extending electrode portion 121 and the third extending electrode portion 133. For example, the seventh branch electrode portions 136 may be tilted by about 45 degrees with respect to the third direction D3 and the fourth direction D4. For example, the seventh branch electrode portions 136 may be tilted by about 35 degrees with respect to the first direction D1. The seventh electrode portions 136 may be tilted by about 125 degrees with respect to the second direction D2.

Eighth branch electrode portions 138 among the branch electrode portions may be disposed in an eighth domain. The eighth domain may correspond to a fourth quadrant with respect to the portion at which the first extending electrode portion 121 and the third extending electrode portion 133 cross. Each of the eighth branch electrode portions 138 may have the third width W2. The eighth branch electrode portions 138 may be spaced apart from each other forming eighth slits SL34. Each of the eighth slits SL34 may have the fourth width S2. The eighth branch electrode portions 138 may extend in the fifth direction D5 from the first extending electrode portion 121 and the third extending electrode portion 133. For example, the eighth branch electrode portions 138 may be tilted by about 45 degrees with respect to the third direction D3 and the fourth direction D4. For example, the eighth branch electrode portions 138 may be tilted by about 125 degrees with respect to the first direction D1. The eighth electrode portions 138 may be tilted by about 35 degrees with respect to the second direction D2.

In the present exemplary embodiment, the first to eighth branch electrode portions 122, 124, 126, 128, 132, 134, 136 and 138 may define the plurality of domains. Widths of the first slits SL21 to the eighth slits SL34 may be different from each other in the domains. Also, widths of the first branch electrode portions 122 to the eighth branch electrode portions 138 may be different from each other in the domains.

As mentioned above, according to one or more exemplary embodiment of the three-dimensional image display device, an electrode pattern of a pixel electrode in the liquid crystal display panel may be tilted by an angle with respect to an extending direction of lens electrodes in the liquid crystal lens panel instead of an extending direction of the gate line or the data line, thereby substantially parallelizing a polarizing axis of a display panel assembly with a polarizing axis of a lens panel assembly to increase luminance of a three-dimensional image.

Also, an alignment direction of an upper alignment layer of the liquid crystal lens panel may be substantially parallel with an alignment direction of a lower alignment layer of the liquid crystal lens panel, thereby reducing moiré phenomenon which may occur due to a light blocking pattern of the liquid crystal display panel.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings and advantages of the present invention. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A three-dimensional image display device comprising:
a liquid crystal display panel comprising:
a first array substrate comprising:
a gate line extending in a first direction;
a data line extending in a second direction substantially perpendicular to the first direction; and
a pixel electrode electrically connected to the gate line and the data line, the pixel electrode having a plurality of first branch electrode portions having a first width, each of the plurality of first branch electrode portions being spaced apart from each other by a first interval substantially equal to or greater than the first width; and
a liquid crystal lens panel comprising a second array substrate, the second array substrate comprising a plurality of lens electrodes, each of the plurality of lens electrodes extending in a third direction which is tilted with respect to the second direction by a first angle, the first angle having an absolute value in a range of greater than or equal to about 5 degrees and less than or equal to about 15 degrees,
wherein each of the plurality of first branch electrode portions extends in a fourth direction having a first tilting angle with respect to the third direction by about 45 degrees or about 135 degrees.

2. The three-dimensional image display device of claim 1, further comprising:
a light source part configured to provide light to the liquid crystal display panel;
a first polarizer disposed between the light source part and the liquid crystal display panel;
a second polarizer disposed between the liquid crystal display panel and the liquid crystal lens panel; and
a third polarizer configured to receive the light from the liquid crystal lens panel.

3. The three-dimensional image display device of claim 2, wherein a first polarizing axis of the first polarizer is substantially perpendicular to the third direction.

4. The three-dimensional image display device of claim 3, wherein a second polarizing axis of the second polarizer and a third polarizing axis of the third polarizer are substantially parallel with the third direction.

5. The three-dimensional image display device of claim 4, wherein the liquid crystal lens panel further comprises a second opposing substrate facing the second array substrate, the second opposing substrate comprising a first alignment layer and
the second array substrate further comprises a second alignment layer disposed on the lens electrodes,
wherein a first alignment direction of the first alignment layer and a second alignment direction of the second alignment layer are substantially parallel with the third direction.

6. The three-dimensional image display device of claim 1, wherein the first width is in a range from about 1 μm to about 10 μm.

7. The three-dimensional image display device of claim 1, wherein the plurality of first branch electrode portions extends in directions substantially symmetrically to each other with respect to the third direction.

8. The three-dimensional image display device of claim 1, wherein the pixel electrode further comprises a plurality of second branch electrode portions having a second width greater than the first width, each of the plurality of second branch electrode portions being spaced apart from each other by a second interval substantially equal to or greater than the second width, and
each of the plurality of second branch electrode portions extends in a fifth direction having a second tilting angle with respect to the third direction, the second tilting angle being different from the first tilting angle.

9. The three-dimensional image display device of claim 8, wherein the pixel electrode further comprises a connection electrode portion which connects the plurality of first branch electrode portions and the plurality of second branch electrode portions.

10. The three-dimensional image display device of claim 9, wherein the connection electrode portion partially extends in the third direction.

11. The three-dimensional image display device of claim 10, wherein the connection electrode portion comprises:
a first extending electrode portion substantially parallel with the third direction; and
a second extending electrode portion substantially perpendicular with the third direction.

12. The three-dimensional image display device of claim 1, wherein the pixel electrode further comprises a plurality of domains defined by a plurality of branch electrode portions comprising the plurality of first branch electrode portions,
wherein the plurality of branch electrode portions extending in different directions, and
each areas of the plurality of domains are different from each other.

13. The three-dimensional image display device of claim 12, wherein the pixel electrode comprises at least four domains.

14. The three-dimensional image display device of claim 1, wherein the liquid crystal display panel further comprises a light blocking pattern disposed to overlap the gate line and the data line.

15. A three-dimensional image display device comprising:
a liquid crystal display panel configured to display an image and comprising:
a first array substrate comprising:
a gate line extending in a first direction;
a data line extending in a second direction substantially perpendicular to the first direction; and
a pixel electrode electrically connected to the gate line and the data line and comprising a sub-electrode pattern comprising a plurality of slits;
a first opposing substrate facing a first surface of the first array substrate; and
a first liquid crystal layer disposed between the first opposing substrate and the first surface of the first array substrate; and
a liquid crystal lens panel configured to refract light from the liquid crystal display panel and comprising:
a second array substrate comprising a plurality of lens electrodes extending in a third direction which is tilted by a first angle with respect to the second direction, the first angle being greater than or equal to about −15 degrees and less than or equal to about −5 degrees or the first angle being greater than or equal to about +5 degrees and less than or equal to about +15 degrees;

a second opposing substrate facing the second array substrate and comprising a lens common electrode; and a second liquid crystal layer disposed between the second array substrate and the second opposing substrate, wherein the slits extend in a fifth direction tilted by a second angle with respect to the third direction or a fourth direction substantially perpendicular to the third direction, the second angle having a second absolute value in a range from a first absolute value of the first angle to about 45 degrees.

16. The three-dimensional image display device of claim 15, further comprising:

a first polarizer facing a second surface of the first array substrate, the second surface of the first array substrate being opposite to the first surface of the first array substrate;

a second polarizer disposed between the liquid crystal display panel and the liquid crystal lens panel; and a third polarizer configured to receive the light from the liquid crystal lens panel.

17. The three-dimensional image display device of claim 16, wherein a first polarizing axis of the first polarizer is substantially parallel with the fourth direction.

18. The three-dimensional image display device of claim 17, wherein a second polarizing axis of the second polarizer and a third polarizing axis of the third polarizer are substantially parallel with the third direction.

19. The three-dimensional image display device of claim 15, wherein the second opposing substrate further comprises a first alignment layer, wherein the second array substrate further comprises a second alignment layer disposed on the plurality of lens electrodes, and wherein a first alignment direction of the first alignment layer and a second alignment direction of the second alignment layer are substantially parallel with the third direction.

20. The three-dimensional image display device of claim 15, wherein the fifth direction is tilted from the first direction by an angle among about 35 degrees, about 55 degrees, about 125 degrees and about 145 degrees.

* * * * *